US008174809B2

(12) United States Patent
Sauerlander et al.

(10) Patent No.: US 8,174,809 B2
(45) Date of Patent: May 8, 2012

(54) ARRANGEMENT AND METHOD FOR DEACTIVATING ELECTRICAL ELEMENTS WHEN MALFUNCTIONING

(75) Inventors: Georg Sauerlander, Aachen (DE); Gian Hoogzaad, Mook (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 131 days.

(21) Appl. No.: 12/373,792

(22) PCT Filed: Jul. 10, 2007

(86) PCT No.: PCT/IB2007/052724

§ 371 (c)(1), (2), (4) Date: Jan. 14, 2009

(87) PCT Pub. No.: WO2008/012711

PCT Pub. Date: Jan. 31, 2008

(65) Prior Publication Data

US 2009/0310269 A1 Dec. 17, 2009

(30) Foreign Application Priority Data

Jul. 26, 2006 (EP) .................................... 06117892

(51) Int. Cl.
*H02H 3/00* (2006.01)
*H02H 3/20* (2006.01)

(52) U.S. Cl. ........................................ 361/88; 361/91.5

(58) Field of Classification Search ..................... 361/88
See application file for complete search history.

(56) References Cited

U.S. PATENT DOCUMENTS

| | | | | |
|---|---|---|---|---|
| 6,870,328 | B2 * | 3/2005 | Tanabe et al. | 315/291 |
| 2005/0018726 | A1 | 1/2005 | Dinger et al. | |

FOREIGN PATENT DOCUMENTS

| | | | |
|---|---|---|---|
| DE | 10358447 | B3 | 5/2005 |
| EP | 1322139 | A1 | 6/2003 |
| EP | 1545 163 | * | 12/2004 |
| EP | 1545163 | A1 | 6/2005 |
| WO | 0133912 | A1 | 5/2001 |

* cited by examiner

*Primary Examiner* — Jared Fureman
*Assistant Examiner* — Lucy Thomas
(74) *Attorney, Agent, or Firm* — John F. Salazar; Mark L. Beloborodov

(57) ABSTRACT

Arrangements (1) are provided with electrical elements (11, 21) for, in a feeding mode, receiving feeding signals and, in a non-feeding mode, not receiving the feeding signals, and with circuits (12,22) for, in the feeding mode, detecting malfunctions of the electrical elements (11,21). The circuits (12,22) comprise active switches (13,23) for, in response to detection results, deactivating the electrical elements (11,21) in both modes, in other words in the feeding mode as well as the non-feeding mode. The electrical elements (11,21) for example comprise light emitting diodes, incandescent lights or loudspeakers etc. The active switches (13,23) for example comprise bistable micro-relays or semiconductor switches such as non-volatile power semiconductor switches such as one time programmable flash power MOSFETs etc. Preferably, the arrangements (1) are integrated arrangements.

11 Claims, 2 Drawing Sheets

ARRANGEMENT AND METHOD FOR DEACTIVATING ELECTRICAL ELEMENTS WHEN MALFUNCTIONING

Figure 1:
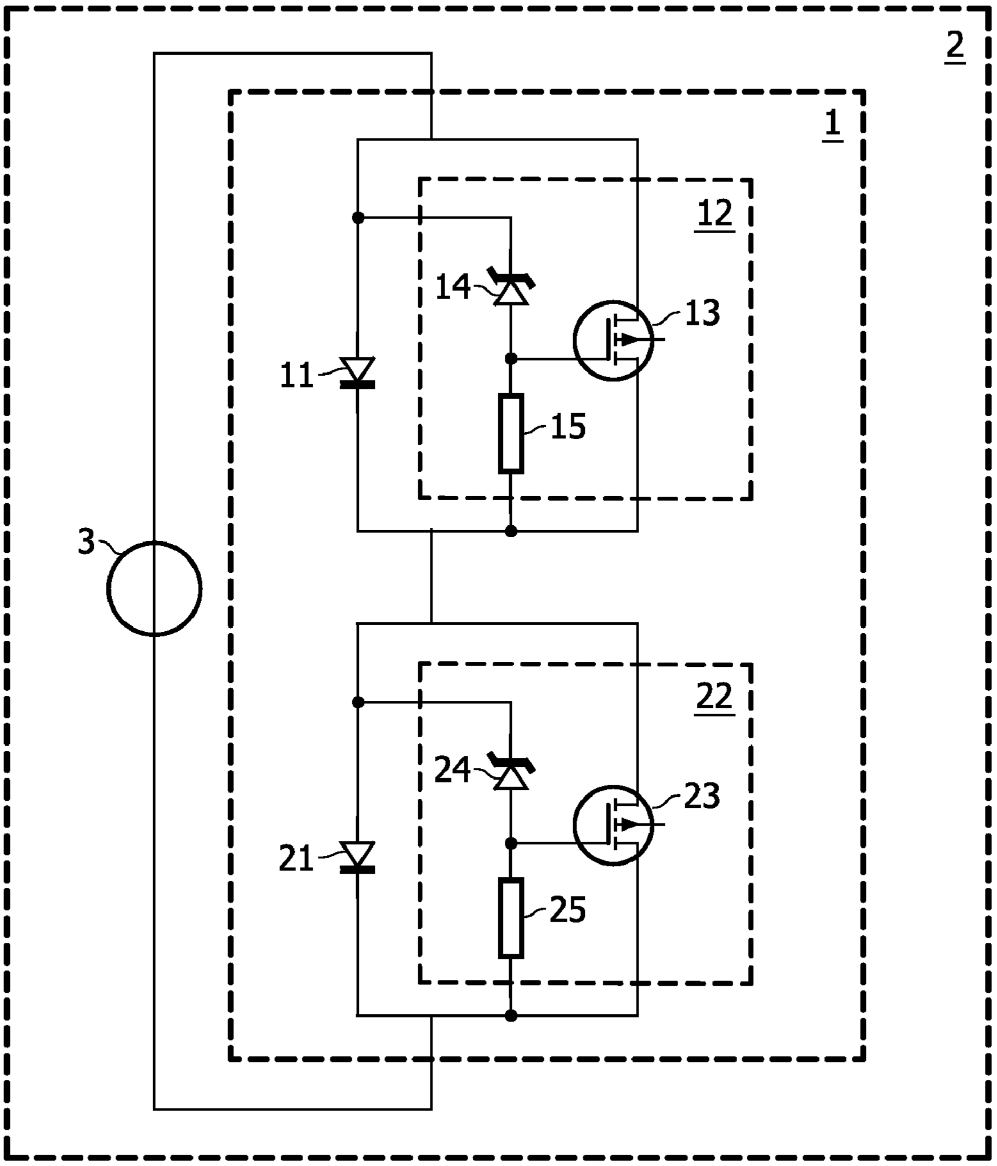

This application is a national stage application under 35 U.S.C. §371 of International Application No. PCT/IB2007/052724 filed on Jul. 10, 2007, and published in the English language on Jan. 31, 2008, as International Publication No. WO/2008/012711, which claims priority to European Application No. 06117892.7, filed on Jul. 26, 2006, incorporated herein by reference.

The invention relates to an arrangement comprising an electrical element, and also relates to a device comprising an arrangement and to a method.

Examples of such an electrical element are light emitting diodes, and examples of such a device are consumer products and non-consumer products.

WO 01/33912 A1 discloses a light emitting diode array having active shunts connected in parallel to the light emitting diodes, sensing means for sensing failures of the light emitting diodes, and control means for activating the active shunts of each light emitting diode whose failure has been sensed.

Preferably, the remote sense and digital control logic is designed to store the identity of the failing light emitting diodes, to eliminate the need to repeat the sequential polling process upon each start of the host device, as disclosed on page 6 line 30 to page 7 line 2 of WO 01/33912 A1. Such a storage of the identity of the failing light emitting diodes in the remote sense and digital control logic is relatively complex. In addition, an activated voltage source is required to keep the logic alive. When the voltage source is deactivated, the active shunt usually returns to its initial state again.

It is an object of the invention, inter alia, to provide a relatively simple arrangement.

Further objects of the invention are, inter alia, to provide a relatively simple device and method.

The arrangement according to the invention comprises

- an electrical element for, in a feeding mode, receiving a feeding signal and, in a non-feeding mode, not receiving the feeding signal, and
- a circuit for, in the feeding mode, detecting a malfunction of the electrical element, which circuit comprises an active switch for, in response to a detection result, deactivating the electrical element in both modes.

In the feeding mode, the electrical element, such as a light emitting diode, an incandescent light or a loudspeaker, is in operation and receives the feeding signal. In the non-feeding mode, the electrical element is not in operation and does not receive the feeding signal. In the feeding mode, the circuit detects a malfunction or a failure condition or a failure state of the electrical element. In response of a detection result, the active switch, such as a micro-relay or a semiconductor switch, deactivates the electrical element for both modes. In other words, the active switch deactivates the electrical element for the feeding mode as well as for the non-feeding mode.

So, after the deactivation of the electrical element, the active switch keeps the electrical element deactivated, independently from the feeding signal being supplied or not. As a result, it is no longer necessary to store identities of failing light emitting diodes at a central location, and the arrangement according to the invention is relatively simple. Furthermore, no auxiliary supply voltage is needed to keep the active switch in its proper state.

An embodiment of the arrangement is defined by claim 2. In general, the malfunction comprises a deviation of a normal impedance and/or voltage value of the electrical element in the feeding mode. More in particular, the malfunction comprises a minimum deviation of a nominal impedance and/or voltage value of the electrical element in the feeding mode. In case of a plurality of electrical elements being coupled in series, a too high value of the impedance value of one electrical element will prevent the others from functioning properly. In case of a plurality of electrical elements being coupled in parallel, a too low value of the impedance value of one electrical element will prevent the others from functioning properly.

An embodiment of the arrangement is defined by claim 3. In case of a plurality of electrical elements being coupled in series, an impedance and/or voltage value larger than an upper threshold of one electrical element will prevent the others from functioning properly. By coupling the active switch to the electrical element in parallel, the electrical element is bridged for said deactivating. In other words, said deactivating comprises the bridging of the electrical element. Then, the others can function properly.

An embodiment of the arrangement is defined by claim 4. The active switch comprises a semiconductor switch, such as a non-volatile power semiconductor switch, such as a one time programmable flash power MOSFET.

An embodiment of the arrangement is defined by claim 5. The circuit further comprises a voltage dependent element and a voltage independent element coupled to each other in series, to keep the circuit simple.

An embodiment of the arrangement is defined by claim 6. The voltage dependent element is a simple zener diode and the voltage independent element is a simple resistor.

An embodiment of the arrangement is defined by claim 7. In case of a plurality of electrical elements being coupled in parallel, an impedance and/or voltage value smaller than a lower threshold of one electrical element will prevent the others from functioning properly. By coupling the active switch to the electrical element in series, a path through the electrical element is interrupted for said deactivating. In other words, said deactivating comprises the interrupting of the path through the electrical element. Then, the others can function properly.

Preferably, the electrical element comprises a light emitting diode that is used more and more often in more and more applications, and the arrangement is an integrated arrangement that is produced simply and low costly.

An embodiment of the arrangement is defined by claim 8. Usually, the arrangement further comprises one or more further electrical elements. Such a further electrical element, in the feeding mode, receives a further feeding signal and, in the non-feeding mode, does not receive the further feeding signal. In case of the further electrical element being coupled to the electrical element in series, the feeding signal and the further feeding signal may be different parts of a main feeding voltage or may be relatively identical feeding currents. In case of the further electrical element being coupled to the electrical element in parallel, the feeding signal and the further feeding signal may be different parts of a main feeding current or may be relatively identical feeding voltages. The further circuit detects a malfunction of the further electrical element in the feeding mode. This further circuit may be completely separated from the circuit to detect a malfunction of the further electrical element. Alternatively, the further circuit may partly coincide with the circuit that in the latter case detects malfunctions of more than one electrical element for example in a time multiplexed way. The further circuit comprises the further active switch for, in response to the further detection result, deactivating the further electrical element in both modes. To be able to individually deactivate the electrical elements, individual active switches may be required.

Embodiments of the device according to the invention and of the method according to the invention correspond with the embodiments of the arrangement according to the invention.

An insight might be, inter alia, that it a storage of identities of failing light emitting diodes at a central location is relatively complex.

A basic idea might be, inter alia, that an active switch is to be used for deactivating the electrical element in both modes.

A problem, inter alia, to provide a relatively simple arrangement, device and method, is solved.

A further advantage might be, inter alia, that an increased simplicity might result in an improved compactness of the arrangement and in an improved independence of the electrical elements within the arrangement.

These and other aspects of the invention will be apparent from and elucidated with reference to the embodiment(s) described hereinafter.

Figure 2:
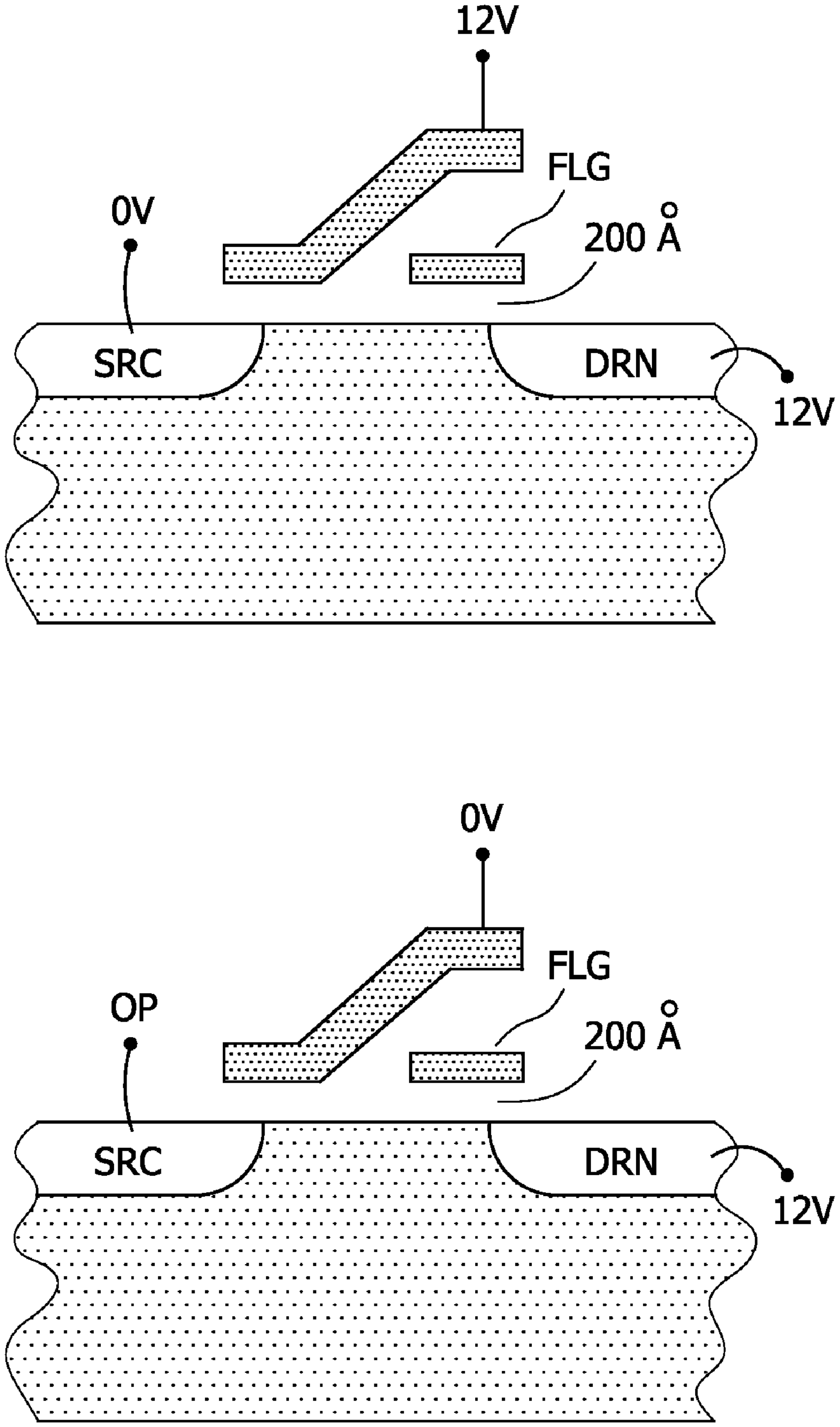

In the drawings:

FIG. 1 shows a device according to the invention comprising an arrangement according to the invention, and FIG. 2 shows an active switch.

A device 2 according to the invention shown in the FIG. 1 comprises an arrangement 1 according to the invention. The arrangement 1 comprises an electrical element 11 for, in a feeding mode, receiving a feeding signal from a feeding source 3 and, in a non-feeding mode, not receiving the feeding signal. The arrangement 1 further comprises a circuit 12 for, in the feeding mode, detecting a malfunction of the electrical element 11. The circuit 12 comprises an active switch 13 for, in response to a detection result, deactivating the electrical element 11 in both modes.

The arrangement 1 also comprises a further electrical element 21 for, in the feeding mode, receiving a further feeding signal from the feeding source 3 and, in the non-feeding mode, not receiving the further feeding signal, which further electrical element 21 is coupled to the electrical element 11 in series. The arrangement 1 further comprises a further circuit 22 for, in the feeding mode, detecting a malfunction of the further electrical element 21. The further circuit 22 comprises a further active switch 23 for, in response to a further detection result, deactivating the further electrical element 21 in both modes.

The active switch 13 for example comprises a semiconductor switch such as a MOSFET. Its main electrodes are coupled to terminals of the electrical element 11. The further active switch 23 for example comprises a further semiconductor switch such as a further MOSFET. Its main electrodes are coupled to terminals of the further electrical element 21. An active switch may be a voltage controlled switch and/or an amplified switch and/or a switch driven by a control signal.

The circuit 12 for example comprises a voltage dependent element 14 such as a zener diode coupled to one of the terminals of the electrical element 11 and a voltage independent element 15 such as a resistor coupled to the other one of the terminals of the electrical element 11, which voltage dependent element 14 and which voltage independent element 15 are further coupled to each other and to a control electrode of the semiconductor switch. The circuit 22 for example comprises a further voltage dependent element 24 such as a further zener diode coupled to one of the terminals of the further electrical element 21 and a further voltage independent element 25 such as a further resistor coupled to the other one of the terminals of the electrical element 21, which further voltage dependent element 24 and which further voltage independent element 25 are further coupled to each other and to a control electrode of the further semiconductor switch.

Usually, a malfunction of an electrical element 11,21 comprises a deviation of a normal impedance and/or voltage value of the electrical element 11,21 in the feeding mode. More particularly, a malfunctioning electrical element 11,21 may have a lower impedance and/or voltage value than usual (and become a “short”) or may have a higher impedance and/or voltage value than usual (and become an “open”).

In the serial embodiment shown in the FIG. 1, in case one of the electrical elements 11,21 becomes a “short”, the other one can still function properly. But in case one of the electrical elements 11,21 becomes an “open”, a current can no longer flow and the other one can no longer function properly.

To avoid this situation, the active switches 13,23 are coupled in parallel to the electrical elements 11,21. In case the impedance value of one of the electrical elements 11,21 becomes larger than an upper threshold, a larger part of the feeding signal in the form of a main feeding voltage will be present across this electrical element 11,21 and across the corresponding voltage divider comprising the zener diode and the resistor. As a result, the corresponding circuit 12,22 has detected a malfunction of this electrical element 11,21, and, in response to this detection result, the corresponding active switch 13,23 is switched for bridging this electrical element 11,21 for said deactivating. So, in this case, the fact that the malfunctioning electrical element 11,21 has become an “open” is overruled by the active switch 13,23 that has been switched into a “short” state.

In case of the feeding signal being a feeding current, the fact that the impedance value of one of the electrical elements 11,21 has become larger than an upper threshold will still result in a larger voltage being present across this electrical element 11,21 and across the corresponding voltage divider comprising the zener diode and the resistor etc.

In a parallel embodiment not shown, in case one of the parallel electrical elements becomes an “open”, the other one can still function properly. But in case one of the parallel electrical elements becomes a “short”, a voltage across the parallel electrical elements becomes zero and the other one can no longer function properly.

To avoid this situation, the active switch is to be coupled in series to the electrical element and the further active switch is to be coupled in series to the further electrical element, to create two serial branches that are to be coupled in parallel to each other. In case the impedance and/or voltage value of one of the electrical elements becomes smaller than a lower threshold, a larger part of the feeding signal in the form of a main feeding current will flow through this electrical element and for example through a serial impedance between the electrical element and its active switch. A larger current through the serial impedance introduces a larger voltage across this serial impedance. As a result, the corresponding circuit has detected a malfunction of this electrical element, and, in response to this detection result, the corresponding active switch is switched for interrupting a path through this electrical element for said deactivating. So, in this case, the fact that the malfunctioning electrical element has become a “short” is overruled by the active switch that has been switched into an “open” state.

In case of the feeding signal being a feeding voltage, the fact that the impedance and/or voltage value of one of the electrical elements has become smaller than a lower threshold will still result in a larger current voltage flowing through this electrical element etc.

The active switch may be a one time programmable switch, which means that once the active switch has been switched into a state it stays in this state even in case a feeding supply is switched off. Such an active switch is for example a bistable micro-relay. Another active switch is a non-volatile power semiconductor switch, such as a flash power MOSFET, as shown in the FIG. 2.

In the FIG. 2 upper part, the programming via a hot electron injection is shown for a MOSFET. The source SRC is connected to 0 Volt, the drain DRN is connected to 12 Volt, the gate is connected to 12 Volt and the floating gate FLG is about 200 Å from the drain DRN. In the FIG. 2 lower part, the erasure via tunneling is shown for a MOSFET. The source SRC is open indicated by OP, the drain DRN is connected to 12 Volt, the gate is connected to 0 Volt and the floating gate FLG is about 200 Å from the drain DRN.

The purpose of an internal floating gate FLG might be to establish a latch function. Depending on a voltage at an external gate, electrons are moved ("injected") on to the gate or removed ("erased") from the gate (which might require relatively short distances between the drain DRN and the floating gate FLG, e.g. 200 Å). This may be considered to be "hot electron injection" and "erasure via tunneling". Due to a good insulation of the floating gate FLG, the charge can remain there for many years. For this reason the MOSFET can stay ON without an external voltage source being required.

In the FIG. 1 a standard MOSFET is shown. Already there an ON time without an external voltage source being involved can be increased by choosing a relatively high impedance of a gate resistor R. The ON time without an external voltage source being involved is then determined by the RC time constant, where C is the input gate capacitance of the MOSFET (a voltage controlled switch).

So, in case in the FIG. 1 the ON time is to be increased, from for example seconds or minutes to years or decades, one concept might be to introduce the floating gate FLG shown in the FIG. 2.

The electrical elements 11,21 for example each comprise one or more light emitting diodes. Alternatively, an electrical element may comprise an incandescent light or a loudspeaker etc. Of course, in case of the feeding signal not being a DC feeding signal but an AC feeding signal, diodes and/or rectifiers might need to be added to the circuits 12,22, and/or semiconductor switches might need to be coupled in an anti-parallel way to the semiconductor switches already present etc.

Preferably, the arrangement 1 is an integrated arrangement. Such an integrated arrangement is simple, low cost and robust, and might be produced and/or sold separately from the device. A device may comprise more than one arrangement in a serial and/or parallel connection.

Advantages might be an improved reliability owing to the fact that an increased fault tolerance has been achieved, an easy integration, a low cost realization, a fact that no additional terminal is required, a fact that no additional (local) voltage supply is required, a fact that a very low conduction loss is possible, and a fact that advantageous non-volatile technology is used.

Further alternative embodiments are not to be excluded. For example more than two electrical elements may be present in series and/or in parallel, and each electrical element may comprise more than one diode or bulb or loudspeaker in a series and/or parallel connection. The voltage divider is an embodiment only, other embodiments e.g. comprising one or more voltage dependent elements and/or one or more voltage independent elements are not to be excluded. The feeding source may form part of the device 2 or may form part of the arrangement 1 or may be situated outside the device 2.

Other and/or further modes are not to be excluded, such as an operation mode and a non-operation mode etc. In the operation mode, the arrangement is in use and/or the device is in use, and in the non-operation mode the arrangement is not in use and/or the device is not in use. In the operation mode, the electrical element may be fed in the feeding mode and may not be fed in the non-feeding mode. So, the operation mode comprises the feeding mode and the non-feeding mode, and the non-operation mode is a further mode different from the feeding mode and the non-feeding mode etc.

Summarizing, arrangements 1 are provided with electrical elements 11,21 for, in a feeding mode, receiving feeding signals and, in a non-feeding mode, not receiving the feeding signals, and with circuits 12,22 for, in the feeding mode, detecting malfunctions of the electrical elements 11,21. The circuits 12,22 comprise (basic idea) active switches 13,23 for, in response to detection results, deactivating the electrical elements 11,21 in both modes, in other words in the feeding mode as well as the non-feeding mode. These arrangements 1 are relatively simple. The electrical elements 11,21 for example comprise light emitting diodes, incandescent lights or loudspeakers etc. The active switches 13,23 for example comprise bistable micro-relays or semiconductor switches such as non-volatile power semiconductor switches such as one time programmable flash power MOSFETs etc. Preferably, the arrangements 1 are integrated arrangements.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An electrical device comprising:

an electrical element operating in one of a feeding mode and a non-feeding mode, the electrical element receiving a feeding signal in the feeding mode and, in a non-feeding mode, not receiving the feeding signal, and a circuit in electrical connectivity to said electrical element and operable to detect a malfunction of the electrical element in the feeding mode, the circuit comprising a programmable active switch for non-permanently deactivating the electrical element for operation in both feeding and non-feeding modes in response to detection of the malfunction.

2. The electrical device as defined in claim 1, wherein the malfunction comprises a deviation of a normal impedance and/or voltage value of the electrical element in the feeding mode.

3. The electrical device as defined in claim 2, the impedance and/or voltage value of the electrical element being larger than an upper threshold and the active switch being coupled in parallel to the electrical element for, in response to the detection of the malfunction, bridging the electrical element for said non-permanently deactivating.

4. The electrical device as defined in claim 3, the active switch comprising a semiconductor switch, main electrodes of the semiconductor switch being coupled to terminals of the electrical element.

5. The electrical device as defined in claim 4, the circuit further comprising a voltage dependent element coupled to one of the terminals of the electrical element and a voltage independent element coupled to the other one of the terminals of the electrical element, which voltage dependent element and which voltage independent element are further coupled to each other and to a control electrode of the semiconductor switch.

6. The electrical device as defined in claim 5, the voltage dependent element being a zener diode and the voltage independent element being a resistor.

7. The electrical device as defined in claim 2, the impedance and/or voltage value of the electrical element being smaller than a lower threshold and the active switch being coupled serially to the electrical element for, in response to the detection of the malfunction, interrupting a path through the electrical element for said deactivating.

8. An electrical device for deactivating an LED in a feeding or non-feeding mode, comprising:

a plurality of LEDs in series, said LEDs in electrical connectivity with a voltage source, said voltage source defining a feeding mode and a non-feeding mode;

each of said plurality of LEDs having:

a fault detection circuit in parallel with said LED, said fault detection circuit detecting a malfunction in said LED;

said fault detection circuit including a programmable switch capable of maintaining said fault detection circuit open or closed independently of said voltage source being either in said feeding or non-feeding mode;

said programmable switch having a gate control, said gate control coupled to a voltage dependent and a voltage independent element, each of said voltage dependent and voltage independent element coupled to terminals of said LED.

9. The electrical device for deactivating an LED of claim 8 wherein said programmable switch is a semiconductor switch, the gate of said semiconductor switch correspondingly connected to said gate control.

10. The electrical device for deactivating an LED of claim 9 wherein said voltage dependent element is a zener diode in series with said voltage independent element, said gate control electrically interposed between said zener diode and said voltage independent element.

11. An electrical device for deactivating an electrical element, comprising:

a plurality of LEDs, each of said LEDs in connectivity to a feeding source, said feeding source defining a feeding mode and a non-feeding mode;

wherein each of said plurality of LEDs is in a bridging parallel relationship with a malfunction detection circuit, said malfunction detection circuit including:

an active programmable switch having a gate control and a source and a drain, said active programmable switch maintaining an open or closed state independent of either said feeding mode or said non-feeding mode;

said gate control of said active programmable switch in electrical interposed relationship between a voltage dependent and voltage independent element, said voltage dependent element being connected to a first terminal of said LED, said voltage independent element being connected to a second terminal of said LED;

wherein said active programmable switch is capable of bridging said LED upon detection of a fault in said LED and reversibly maintain said bridged status in either said feeding or non-feeding mode to respectively maintain said LED in connectivity with said feeding source or alternatively remove said LED connectivity with said feeding source in either of said modes.

* * * * *